(No Model.)
H. L. WHITTREDGE.
COMBINED DISK CULTIVATOR AND HARROW.
No. 527,519. Patented Oct. 16, 1894.
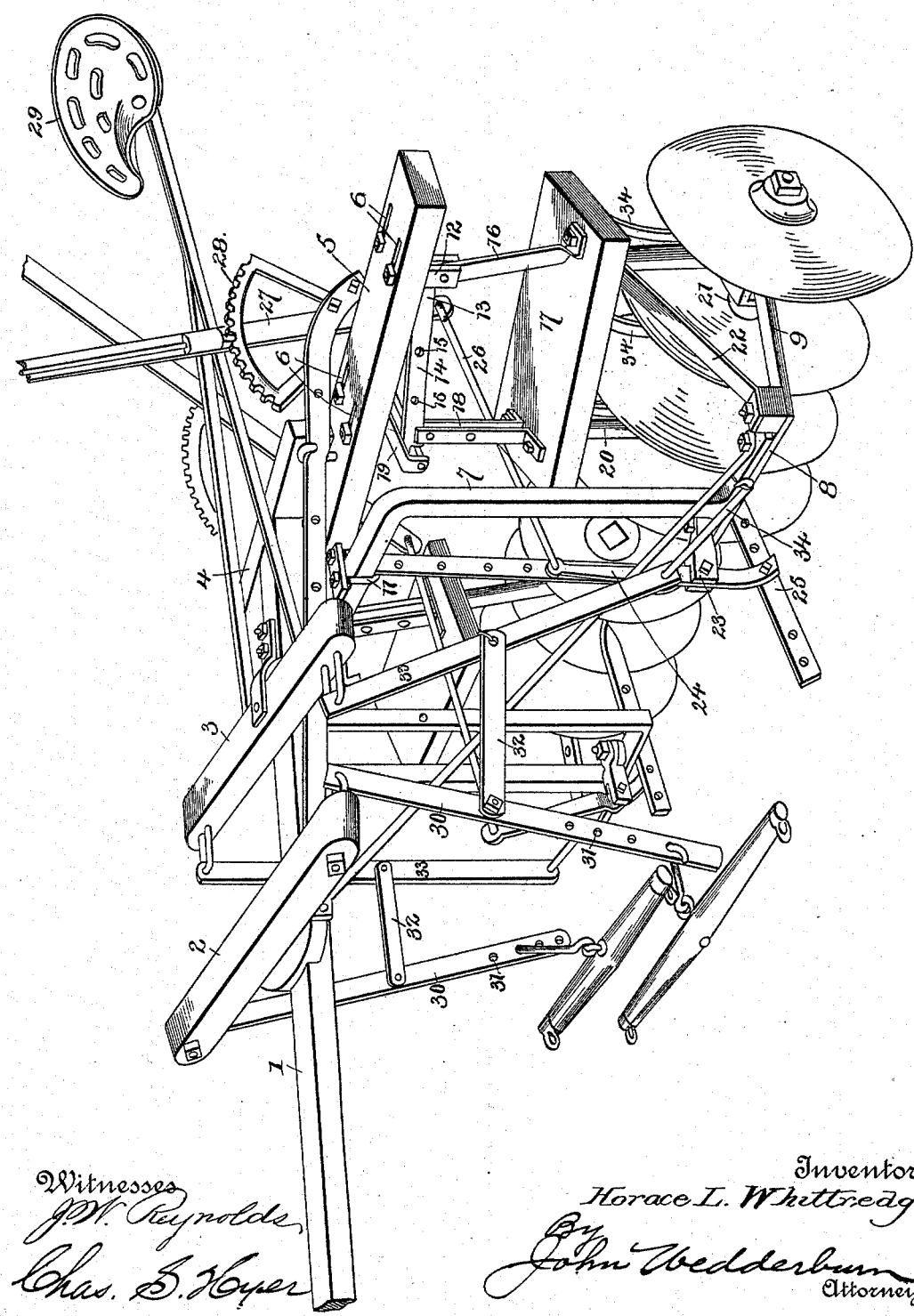
Witnesses
J. W. Reynolds
Chas. S. Hyer
Inventor
Horace L. Whittredge
By John Wedderburn
Attorney

UNITED STATES PATENT OFFICE.

HORACE L. WHITTREDGE, OF ADMIRE, KANSAS.

COMBINED DISK CULTIVATOR AND HARROW.

SPECIFICATION forming part of Letters Patent No. 527,519, dated October 16, 1894.

Application filed April 18, 1894. Serial No. 507,997. (No model.)

*To all whom it may concern:*

Be it known that I, HORACE L. WHITTREDGE, a citizen of the United States, and a resident of Admire, in the county of Lyon and State of Kansas, have invented certain new and useful Improvements in a Combined Disk Cultivator and Harrow; and I do hereby declare the following to be a full, clear, and exact description of the invention, such as will enable others skilled in the art to which it appertains to make and use the same.

This invention relates to combined disk cultivators and harrows, and has for its object to provide simple and effective means for adjusting the several parts, especially the gangs of disks and also to decrease the extent of the gangs with disks.

A further object is to regulate the draft in accordance with the depth of penetration of the disks.

With these and other objects in view, the invention consists of the construction and arrangement of the several parts which will be more fully hereinafter described and claimed.

The accompanying drawing shows a perspective view of a combined disk cultivator and disk harrow embodying the invention.

Referring to the drawing, the numeral 1 designates a tongue to which all the parts of the device are attached either directly or indirectly and has thereon a single tree 2 in rear of which is a second single tree 3 and at the rear end is supplied with a head block 4 which is secured to a transversely arranged beam 5 having series of parallel slots 6 near the opposite ends thereof arranged in pairs. An arched bar 7 is secured to the tongue in advance of the head block 4 and its lower ends are attached in an adjustable manner to the horizontal members of oppositely disposed L-shaped frames 8 having rearward right angular extensions 9 while the vertical members of the said L-shaped frames are provided with a series of apertures 10 and adjustably attached to the upper portion of the arch of the bar 7 by a tie clip 11. Adjustably attached to the outer pair of parallel slots 6 at each end of the beam 5 is a fulcrum pendant 12 consisting of two bars which are spaced apart and have adjustably mounted therein elbow-shaped irons 13 provided with horizontal bars 14 formed with openings 15 by means of which the said elbow-shaped irons may be adjusted in the fulcrum pendant, the vertical bar 16 of each elbow-shaped iron being extended downward and secured to the outer top portion of sills 17, while the inner part of the horizontal bar of each elbow-shaped iron is supported by a vertical bracket 18 extending upward from the inner end of each sill 17. The extreme inner ends of the horizontal bars 14 of the elbow-shaped irons are reduced and adjustably mounted in longitudinally disposed guide 19 which are adjustably secured by bolts to the inner pairs of parallel slots 6, and through the medium of the said slots 6 and the openings 15, the elbow-shaped irons as well as the sills carried thereby and the guides 19 may be adjusted outwardly to spread the gangs of disks apart from the center or to move them inward toward the center, as may be found desirable and necessary. Depending from the sills 17 are rods or arms 20 which connect with the axle of each gang of disks 21, the outermost disk of each gang being removable to decrease the working extent of said gang, and it will be understood that the said gangs may be reduced on either side, that is, one gang may use three disks and the other four, or vice versa. The rearwardly extending right-angular member 9 of each L-shaped frame 8 connects with the outer portion of the axle of the gangs of disks, and the sills 17 are braced to the said L-shaped frames by bars 22. To the inner portion of the horizontal bars of the L-shaped frames 8 are secured fulcrum supports 23 in which are movably mounted fulcrum levers 24 having their lower ends adjustably attached to the bars 25 running into and connecting with the rear portion of the axle of each gang of disks. The upper portion of each of the fulcrum levers has attached thereto a rod 26 which connects with the lower end of an operating lever 27 acting in conjunction with a tooth-sector 28 adjacent to the driver's or operator's seat 29. By these means the gang of disks may be operated to change the angle or position relatively to the longitudinal length of the machine.

Movably secured to the rear portion of the opposite ends of the single tree 2 are bars 30 having apertures or openings 31 near their lower ends, to which the draft mechanism or apparatus may be adjustably attached. The said bars 30 are connected by braces 32 with rear bars 33, whose upper ends are movably attached adjacent to the opposite ends of the single tree 3 and have their lower ends secured by hooks 34 to the L-shaped frames or adjacent portions of the mechanism to regulate and equalize the draft, it being seen that the adjustable features will be very convenient and advantageous in working the machine.

The L-shaped frames prevent the disks or gangs of disks from buckling and hold them in their places, and adjacent to the disks are a series of scrapers 34 to clean the said disks and keep them free of clogged material as will be readily understood.

To convert the device into a disk harrow the short group of gangs are removed and a longer axle or rod is inserted, and another disk added to the rear end of the gang, and so on until there are six disks in each gang. The double trees are then removed, which are employed in connection with the cultivator and an attachment of the draft is made to the lower portion of the arch. This makes a very convenient and simple device, readily convertible from one use to another.

Having thus described the invention, what is claimed as new is—

1. In an agricultural implement of the character herein set forth, the combination of a sill having a gang attached thereto, a beam, an elbow-shaped iron having its vertical member attached to one end of the sill and pivotally connected at or near the elbow to the said beam, an upright at the opposite end of the said sill connected to the horizontal member of the said elbow shaped iron, and a guide attached to the beam and adapted to receive the end of the said elbow shaped iron to guide it in its movements, substantially as set forth.

2. In combination, a beam, a sill provided with a gang, an elbow shaped iron having pivotal and adjustable connection with the said beam and fixedly attached by means of its vertical member to one end of the said sill, an upright at the opposite end of the sill adjustably connected with the horizontal member of the said elbow iron, and a guide adjustably connected with the said beam and adapted to receive the end of the horizontal member of the aforesaid elbow shaped iron, substantially as described, for the purpose set forth.

3. In combination, an arch shaped bar attached to a tongue, an approximately right angular shaped frame attached to the lower end of the arched bar and provided with a gang, a vertical bar adjustably connected with the horizontal portion of the arched bar, a lever pivotally supported between its ends and adjustably connected with the forward extension of the gang supporting device, and a hand lever operatively connected with the aforesaid lever as a convenient means of adjusting the gangs to the required inclination relative to the draft, substantially as set forth.

4. In combination, the beam 5 having slots 6, a pendant 12 adjustably supported in one set of slots, a guide 19 adjustably supported in the other set of said slots, an elbow shaped iron pivotally supported in the pendant 12, and having its horizontal member working in connection with the guide 19, and the sill 17 connected at one end to the vertical member of the elbow shaped iron and having an upright which is adjustably connected with the horizontal portion of the said iron, substantially as described, for the purpose set forth.

In testimony whereof I have signed this specification in the presence of two subscribing witnesses.

HORACE L. WHITTREDGE.

Witnesses:
A. J. BURNS,
FREMONT MILLER.